United States Patent [19]

Harris et al.

[11] Patent Number: 5,214,535
[45] Date of Patent: May 25, 1993

[54] LENS COVER ASSEMBLY FOR BINARY DIFFRACTIVE OPTIC LENSES

[75] Inventors: Ellis D. Harris, Claremont; Steven A. Buhler, Redondo Beach, both of Calif.

[73] Assignee: Xerox Corporation, Stamford, Conn.

[21] Appl. No.: 809,622

[22] Filed: Dec. 17, 1991

[51] Int. Cl.$^5$ .......................... G02B 3/08; G02B 27/42
[52] U.S. Cl. ..................................... 359/565; 264/1.6; 264/1.9; 264/157; 359/566; 359/572
[58] Field of Search ............... 359/565, 566, 572, 576, 359/742, 743; 264/1.7, 1.9, 1.6, 154, 157

[56] References Cited

U.S. PATENT DOCUMENTS

| | | | |
|---|---|---|---|
| 3,827,798 | 8/1974 | Alvarez | 359/742 |
| 4,146,306 | 3/1979 | Wallach | 359/743 |
| 4,190,321 | 2/1980 | Dorer et al. | 359/742 |
| 4,591,256 | 5/1986 | Matsumura | 359/572 |
| 4,787,690 | 11/1988 | Maerz | 359/569 |
| 4,813,762 | 5/1989 | Leger et al. | 359/565 |
| 4,828,558 | 5/1989 | Kelman | 351/171 |
| 4,846,552 | 7/1989 | Veldkamp et al. | 359/572 |
| 4,983,002 | 1/1991 | Shikama et al. | 359/562 |
| 4,994,664 | 2/1991 | Veldkamp | 359/565 |

OTHER PUBLICATIONS

G. J. Swanson, "Binary Optics Technology: The Theory and Design of Multi-level Diffractive Optical Elements", *Massachusetts Institute of Technology Lincoln Laboratory Technical Report 854*, Aug. 14, 1989.

*Primary Examiner*—Martin Lerner
*Attorney, Agent, or Firm*—William Propp

[57] ABSTRACT

A plurality of binary diffractive optic lenses are formed in the surface of one substrate and a corresponding plurality of recesses are formed in the surface of another substrate. The binary diffractive optic lenses on one substrate are aligned with the recesses on the other substrate and the two substrates are bonded together. A plurality of individual binary diffractive optic lens cover assemblies are obtained by dicing the two bonded substrates.

30 Claims, 6 Drawing Sheets

LENS COVER ASSEMBLY FOR BINARY DIFFRACTIVE OPTIC LENSES

BACKGROUND OF THE INVENTION

This invention relates to a lens cover assembly, and, more particularly, to a lens cover assembly for binary diffractive optic lenses.

Binary diffractive optic lenses are formed by etching or molding very shallow and precise steps or grooves into the surface of a transparent optical elements. Binary diffractive optic lenses present substantial cost savings over conventional precision glass or plastic optical lenses.

However, binary diffractive optic lenses are susceptible to dirt, oil films from handling and loose particles, all of which can interfere optically with the lens. A major concern with binary diffractive optic lenses is protection of the patterned surface of the lenses.

A binary diffractive optic lens can be cleaned by conventional means such as cleansing solutions of alcohol, glycerin or water. However, these conventional cleansing means may be difficult since the surface of the binary diffractive optical lens is not flat but has microscopic grooves which must be cleaned.

Indeed, conventional cleaning means may cause problems in cleaning binary diffractive optic lenses by damaging the grooves which would interfere with operation of the lens, or by leaving remnants of the cleaning within the grooves which also would interfere with operation of the lens.

It is an object of this invention to provide a novel means to protect binary diffractive optic lenses without interfering with operation of the lenses.

It is another object of this invention to provide a lens cover assembly for binary diffractive optic lens that is more cost effective to manufacture by allowing the concurrent fabrication of large quantities of lens cover assemblies for binary diffractive optic lenses from two substrates.

It is yet another object of this invention to provide a lens cover assembly for a binary diffractive optic lens composed of two substrates which are accurately aligned with each other and bonded together.

SUMMARY OF THE INVENTION

In accordance with the present invention, a plurality of binary diffractive optic lenses are formed in the surface of one substrate and a corresponding plurality of recesses are formed in the surface of another substrate. The binary diffractive optic lenses on one substrate are aligned with the recesses on the other substrate and the two substrates are bonded together. A plurality of individual binary diffractive optic lens cover assemblies are obtained by dicing the two bonded substrates.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
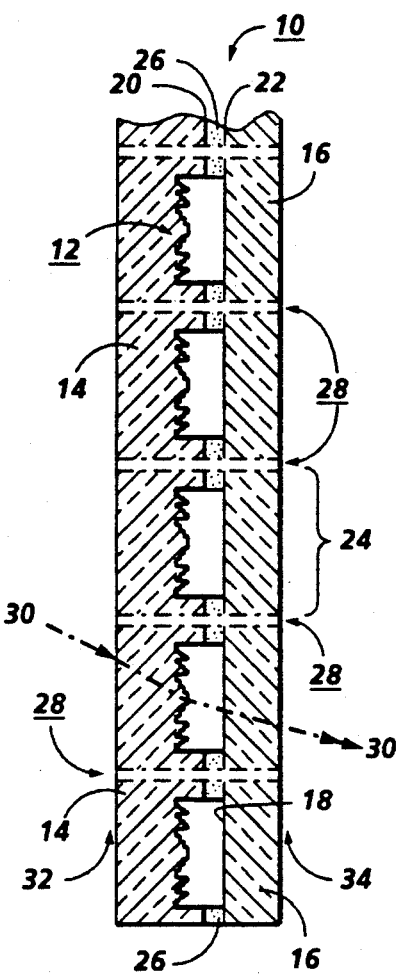
FIG. 1 is a schematic illustration of the cross-section side view of the lens cover assembly for binary diffractive optic lenses formed according to the present invention.

Reference is now made to FIG. 1, wherein there is illustrated a lens cover assembly 10 for a binary diffractive optic lens 12 of this invention.

The substrate 14, upon which the binary diffractive optic lens 12 is formed, is typically fused silica (artificial quartz). The substrate may be glass, quartz, germanium, silicon, or any material that will transmit light in the desired wavelength.

The substrate 16, upon which the lens cover recess 18 is formed, is also typically fused silica (artificial quartz). The substrate may also be glass, quartz, germanium, silicon, or any material that will transmit light in the desired wavelength.

The requirements for the materials for the substrates 14 and 16 is that the material need only transmit the wavelength desired for the binary diffractive optic lenses 12 and that the material take the pattern for the binary diffractive optic lens 12 and the lens cover recess 18. The binary diffractive optic lens substrate 14 and the lens cover substrate 16 need not be of the same material.

The binary diffractive optic lens 12 can be formed on the substrate 14 by conventional photolithographic etching. In general, the etching process involves coating the substantially flat substrate 14 with a photoresist layer, exposing the photoresist layer through a mask with the binary diffractive optic lens pattern, developing the photoresist layer and etching the substrate forming the binary diffractive optic lens pattern in the substrate. The recess 18 in the lens cover substrate 16 is formed in a similar fashion to the binary diffractive optic lens 12 in the binary diffractive optic lens substrate 14. The binary diffractive optic lens pattern, without the specific binary diffractive optic lens pattern, but having only the peripheral outline of the binary diffractive optic lens can be used as the mask to form the lens cover recess pattern.

The lens cover assemblies 10 are fabricated from the two substrates 14 and 16. A plurality of binary diffractive optic lenses 12 have been fabricated on the interior surface 20 of the binary diffractive lens substrate 14 and a corresponding plurality of recesses 18 have been fabricated on interior surface 22 of lens cover substrate 16. Alignment marks can be formed at predetermined locations on the substrates. The binary diffractive optic lenses 12 on one substrate 14 are aligned with the recesses 18 on the other substrate 16, so that a respective one of the plurality of binary diffractive optic lenses is positioned in each recess and the two substrates are bonded together. A plurality of individual binary diffractive optic lens cover assemblies 24 are obtained by dicing the two bonded substrates.

In the preferred embodiment, all the etching is done from one surface of the substrate. The interior surface 20 of the binary diffractive optic lens substrate 14 is chemically cleaned and polished. On the surface 20 of the substrate 14, a mask for a plurality of binary diffractive optic lenses is printed on the interior surface 20 of the binary diffractive optic lens substrate 14 using a conventional photolithographic photoresist. The non-masked areas on the surface 20 of the substrate 14 are etched by reactive ion etching to fabricate the grooves or steps of the binary diffractive optic lenses 12. The reactive ion etching takes about one to twenty minutes and many substrates can be processed simultaneously. The etching depth depends upon the surface area of the substrate exposed to the etchant. The remaining photoresist is removed.

The interior surface 22 of the lens cover substrate 16 is similarly etched to fabricate the recesses 18 of the lens cover. The reactive ion etching takes about forty-five to sixty minutes and many substrates can be processed simultaneously. The mask for the binary diffractive optic lens pattern may be used for the negative mask for the recesses, if only the peripheral outline of the binary diffractive optic lens, rather than the specific diffractive binary diffractive optic lens is used for the mask pattern.

The large recesses 18 of the lens cover substrate 16 take 45 to 60 minutes to etch. The recesses are etched to only as great a depth as necessary for bonding the substrates 14 and 16 together. A greater depth of etching than necessary for bonding may induce non-uniformity of the recess.

In contrast, the smaller grooves or steps of the binary diffractive optic lens 12 of the binary diffractive optic lens substrate 14 require only 20 to 30 minutes. The difference in etching times is due to the depths of the recesses versus the shallower steps or grooves of the binary diffractive optic lens and the larger more coarsely toleranced recesses versus the etching of the smaller, higher toleranced binary diffractive optic lens grooves and steps.

The interior surface 20 of the binary diffractive optic lens substrate 14 and the interior surface 22 of the lens cover substrate 16 serve as the bonding area for bonding the two substrates together, one substrate 14 having the plurality of the binary diffractive optic lenses 12 and the other substrate 16 having the plurality of recesses 18. A coating 26 of adhesive, such as an epoxy resin, is applied to the raised surface 22 of the substrate 16 in such a manner that it does not run or spread into the recesses 16 of the lens cover. Then, the two substrates are aligned together, with the binary diffractive optic lens aligned with the recess to form a lens cover assembly.

The means 26 of bonding the two substrates together is typically by epoxy resin. The epoxy resin bond is approximately 2 microns thick.

Certain thermal setting epoxy resins may require heat curing. Materials for the binary diffractive optic lens substrate and the lens cover substrate must be selected which would not be effected by the heat curing temperature.

Ultraviolet setting epoxy resin is faster to set while thermal setting epoxy resin is better for setting batches.

The bonding means need not be transmissive to the incident light beam. The binary diffractive optic lens and the recess and the substrates are light transmissive while the non-transmissive bonding means could serve to absorb incident light. Thus, the only light transmitted through the lens cover assembly would be the light focussed by the binary diffractive optic lens. The absorptive bonding means would prevent transmission of extraneous light through the lens cover assembly.

Alignment markings can be used to align the binary diffractive optic lens with the corresponding recess. At least two alignment markings can be photolithographically produced at predetermined locations on one or both of the substrates. Alignment markings or opening can be made by other conventional means.

The two substrates 14 and 16 are accurately mated and tacked together by partial curing of the adhesive 26. Alternately, the binary diffractive optic lens substrate 14 and the lens cover substrate 16 can be given precisely diced edges and then manually or automatically aligned in a precision jig. The two substrates are cured in an oven or a laminator to permanently bond them together and then the bonded substrate 10 is milled or diced along lines 28 to produce the individual lens cover assemblies 24 with binary diffractive optic lenses.

The incident light beam 30 passes through the binary diffractive optic lens substrate 14, is diffracted by the binary diffractive optic lens 12, passes through the recess 18, and passes through and exits the lens cover substrate 16.

Several advantages are obtained by this fabrication approach. The microfabrication of the lens cover assemblies batches by reactive ion etching is inexpensive. The lens cover assemblies placement is accurate, especially when delineated with lithographic resolution. The binary diffractive optic lens are accurately aligned with the recesses, using alignment marks. One major advantage is that batch processing is practical in simultaneously etching and fabricating large numbers of lens cover assemblies for binary diffractive optic lenses. The orientation dependent etching has been shown to be a high yielding fabrication process for precise, miniature binary diffractive optic lens and cover assembly.

A possible photoresist layer is KTI 820 having a thickness of about 0.5 to 10 microns is spin coated on the surface of the substrate. The masking and etching may be made by electron beam lithography or by chemical ion etching or by ion bombardment or by UV lithography.

An alternate method of forming the binary diffractive optic lens on the substrate is by a conventional molding process. In general, the molding process involves pressing a mold with the negative of the binary diffractive optic lens pattern into a substantially flat, soft coating, such as a plastic or polymer or other organic material, on a hard substrate forming the binary diffractive optic lens pattern in the coating. The mold is typically nickel. The coating must be able to be mold pressed, be optically transmissive and be able to retain the binary diffractive optic lens pattern so that the lens will operate optically. The hard substrate is typically fused silica (artificial quartz). The substrate may also be glass, quartz, germanium, silicon, or any material that will transmit light in the desired wavelength.

The interior surface 20 of the binary diffractive optic lens substrate 14 including the binary diffractive optic lens 12 and the interior surface 22 of the lens cover substrate 16 including the recess 18 can be coated with an antireflective coating to improve transmission of light beams.

The exterior surface 32 of the binary diffractive optic lens substrate 14 and the exterior surface 34 of the lens cover substrate 16 can be coated with an antireflective coating to improve transmission of light beams.

After the bonding of the binary diffractive optic lens substrate 14 and the lens cover substrate 16, the array of lens cover assemblies 10 is diced into separate individual lens and cover assemblies 24 along lines 28. Separation of the lens cover assemblies can be done by sawing with a diamond saw. Any debris created by the sawing could be easily removed and would not present a problem to the optical operation of the binary diffractive optic lens since the binary diffractive optic lens is already enclosed and protected within the recess of the lens cover assembly.

Separation of the lens cover assemblies by laser cutting tends to be difficult since light beams, even concentrated laser beams, typically pass through the fused silica of the binary diffractive optic lens substrate and lens cover substrate.

Figure 2:
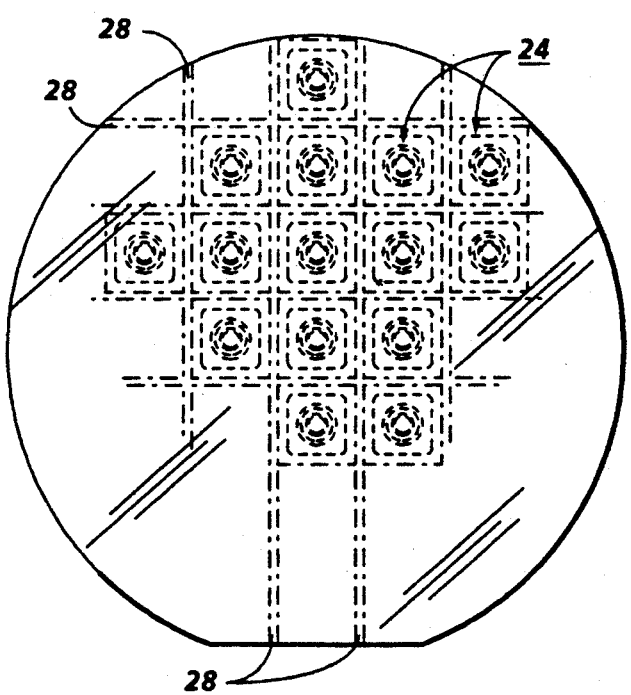
FIG. 2 is a schematic illustration of the top view of the lens cover assembly for binary diffractive optic lenses of FIG. 1 formed according to the present invention.

A plurality of binary diffractive optic lenses and a corresponding plurality of recesses form a plurality of the lens cover assemblies 24 for binary diffractive optic lenses, as shown in FIG. 2.

In fabricating multiple or batch lens cover assemblies for binary diffractive optic lenses, the only requirement is that the binary diffractive optic lenses accurately match the recesses. The individual binary diffractive optic lenses may have different diffractive patterns or be of different sizes and shapes with a corresponding recess from the other binary diffractive optic lens in the batch on the same substrate. The dicing along lines 28 will separate out the individual lens cover assemblies.

As discussed previously, the binary diffractive optic lens pattern can be used with just the peripheral pattern without the interior diffractive pattern for the binary diffractive optic lens to form the pattern for the recess. This provides a match for the binary diffractive optic lens and the recess to form the lens cover assembly.

Figure 3:
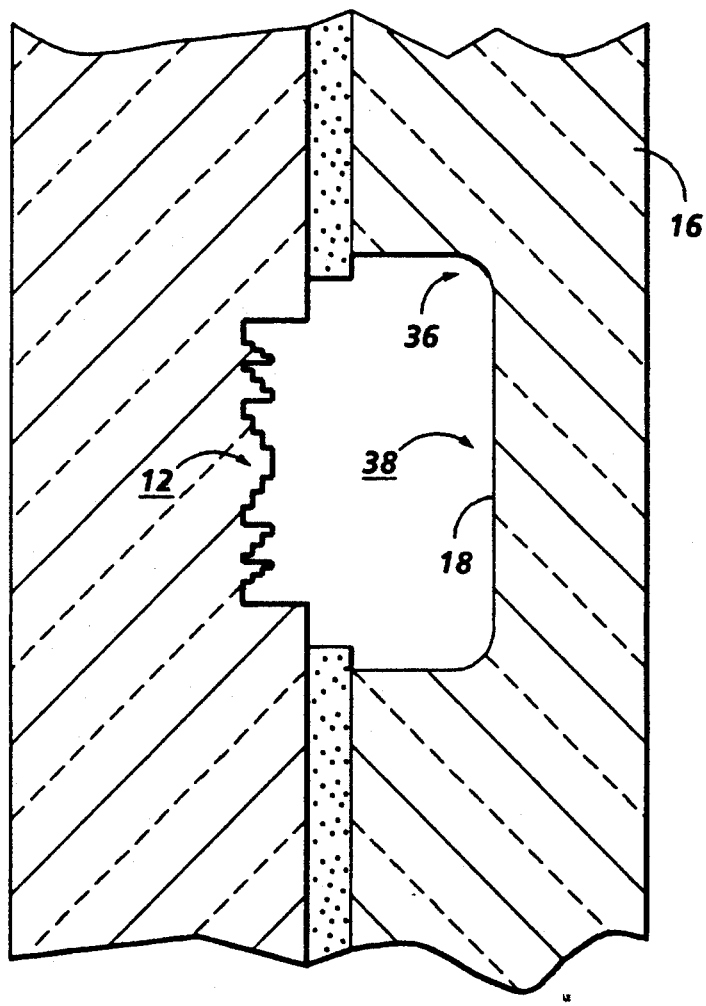
FIG. 3 is a schematic illustration of the cross-section side view of the edges of the lens cover substrate of the laser cover assembly for binary diffractive optic lenses of FIG. 1 formed according to the present invention.

The edges 36 of the recess 18 formed in the lens cover substrate 16 may be curved or rounded as shown in FIG. 3. The etching that forms the recess may not etch to a uniform depth nor form the sharp right angle of the edge of the recess. The resulting curve or rounding may optically interfere with the light transmitted through the lens cover substrate.

The recess 18 should slightly exceed the dimensions of the binary diffractive optic lens 12 to present a flat, unrounded, uncurved surface 38 to the light passing through lens cover substrate, incident upon the binary diffractive optic lens or diffracted by the binary diffractive optic lens.

The lens cover substrate can be tightly bonded to the binary diffractive optic lens substrate to withstand temperature or pressure changes with air or inert gas or vacuum in the recess between the lens cover wafer and the binary diffractive optic lens wafer.

Alternately, a pinhole breather hole can be fabricated between the outside ambient atmosphere and the recess between the lens cover wafer and the binary diffractive optic lens wafer to equalize the pressure and temperature between the two regions. The breather hole should be located in the lens cover assembly so as to not interfere optically with the incident or output light beam nor with the operation of the binary diffractive optic lens.

Figure 4A:
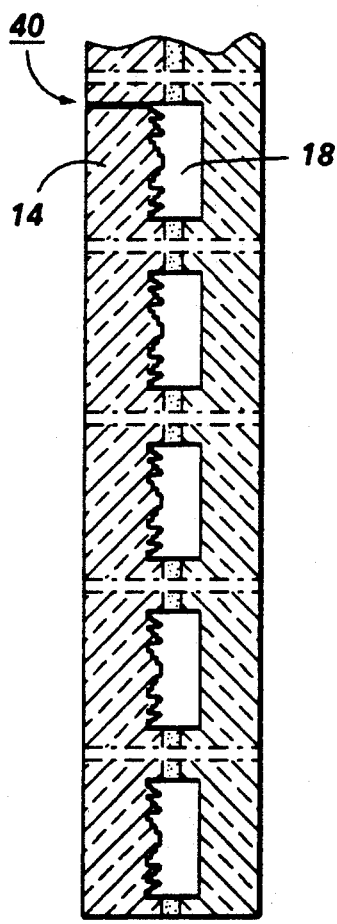
FIGS. 4a, 4b and 4c are schematic illustrations of the cross-section side views of alternate embodiments of a lens cover assembly for binary diffractive optic lenses with a breather hole formed according to the present invention.
Figure 4B:
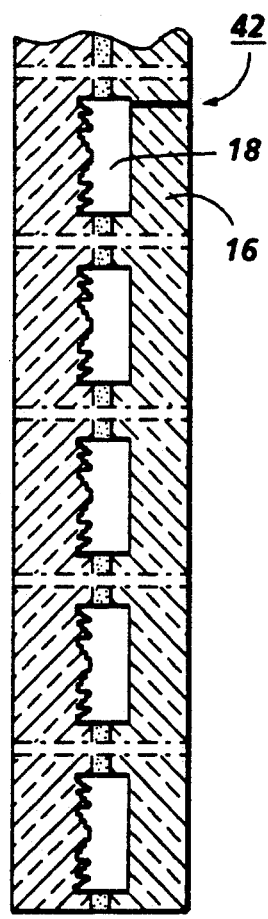
Figure 4C:
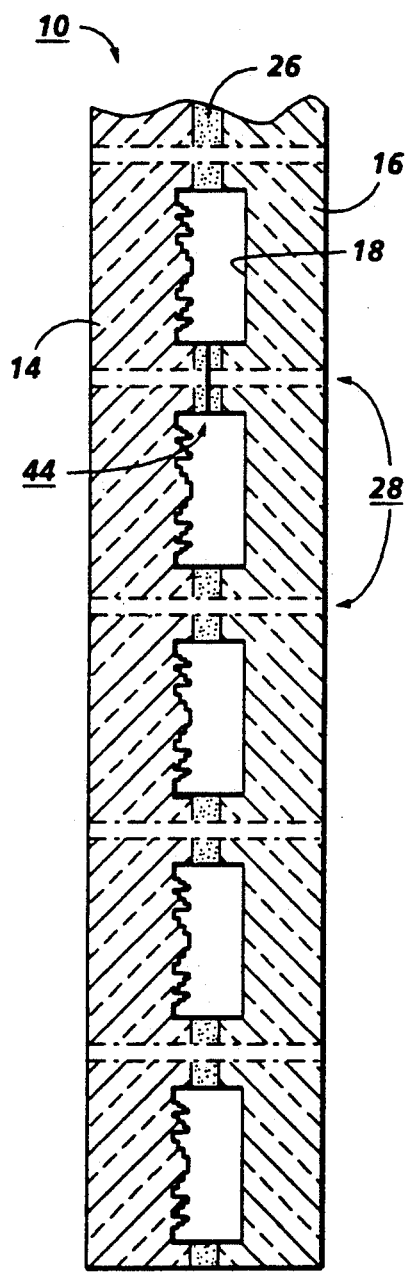

As shown in FIG. 4a, the breather hole 40 can extend through the binary diffractive optic lens substrate 14 to the recess 18. As shown in FIG. 4b, the breather hole 46 can extend through the lens cover substrate 16 to the recess 18. And, as shown in FIG. 4c, the breather hole 44 can extend through the bond 26 between the lens cover substrate 16 and the binary diffractive optic lens substrate 14 to the recess 18. When the lens cover assembly 10 of FIG. 4c is separated by dicing through line 28, the breather hole 44 is revealed and operational.

The photolithographic or nickel molding pattern used in initially forming the binary diffractive optic lens substrate 14 of FIG. 4a or the lens cover substrate 16 of FIG. 4b or either the binary diffractive optic lens substrate 14 or the lens cover substrate 16 of FIG. 4c can be used to fabricate the breather hole. Alternately, the breather hole can be formed by conventional etching methods in a separate step.

The breather hole also allows solvents used in the forming of the interior patterned surfaces of the binary diffractive optic lens wafer and the lens cover wafer forming the recess to evaporate into the outside ambient atmosphere without leaving residue to possibly interfere with the optical operation of the binary diffractive optic lens.

Figure 5:
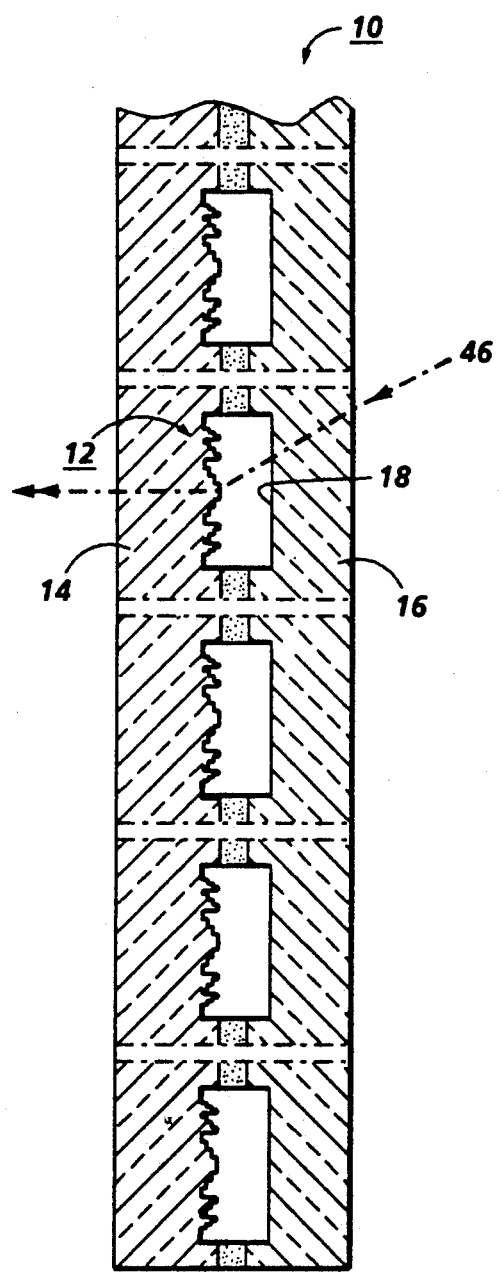
FIG. 5 is a schematic illustration of the cross-section side view of the lens cover assembly for binary diffractive optic lenses with an incident light path through the lens cover formed according to the present invention.

In an alternate light path, as shown in FIG. 5, the incident light beam 46 passes through the lens cover substrate 16, through the recess 18, is diffracted by the binary diffractive optic lens 12, passes through and exits the binary diffractive optic lens substrate 14.

Figure 6:
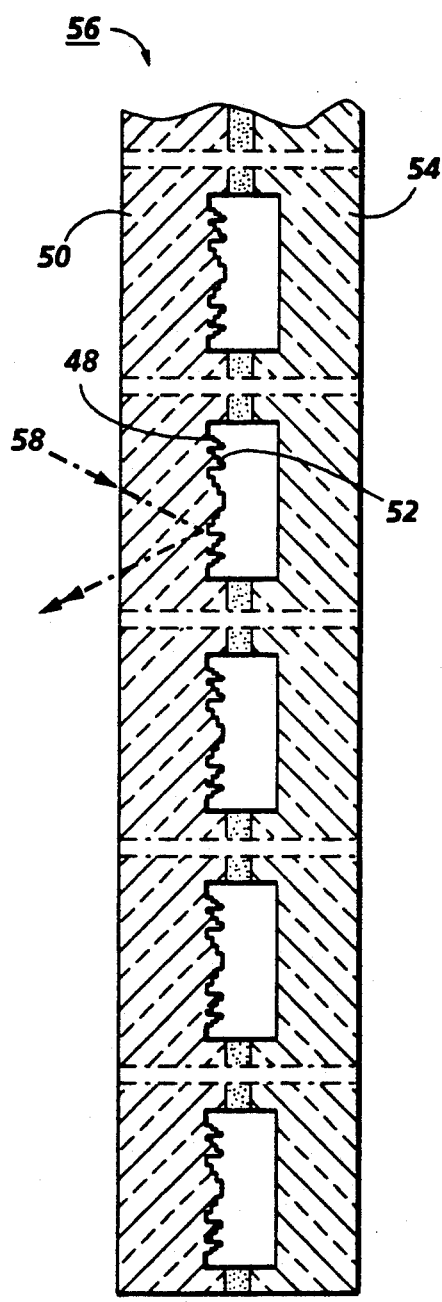
FIG. 6 is a schematic illustration of the cross-section side view of an alternate embodiment of a lens cover assembly for binary diffractive optic lenses with reflective coating formed according to the present invention.

The binary diffractive optic lens can be reflective, rather than transmissive, of the incident light beam. After the binary diffractive optic lens 48 is fabricated on the lens substrate 50 in FIG. 6, the optic lens pattern is coated with a reflective coating 52. Reflective coatings are commercially available. The binary diffractive optic lens substrate 50 is then bonded with the lens cover substrate 54 to form the lens cover assembly 56.

The incident light beam 58 passes through the binary diffractive optic lens substrate 50, is diffracted by the binary diffractive optic lens 48, reflected by the reflective coating 52 on the binary diffractive optic lens, passes through and exits the binary diffractive optic lens substrate 50. The incident and output light beams do not pass through the lens cover substrate.

As previously stated, the binary diffractive optic lens substrate and the lens cover substrate need not be the same material. The lens cover substrate 54 of the lens cover assembly 56 of FIG. 6 need not be fabricated from a material which is optically transmissive to the light beam. The reflective coating 52 need not have a uniform thickness on the binary diffractive optic lens since the light is reflected from the intersection of the binary diffractive optic lens of the substrate and the reflective coating.

Figure 7:
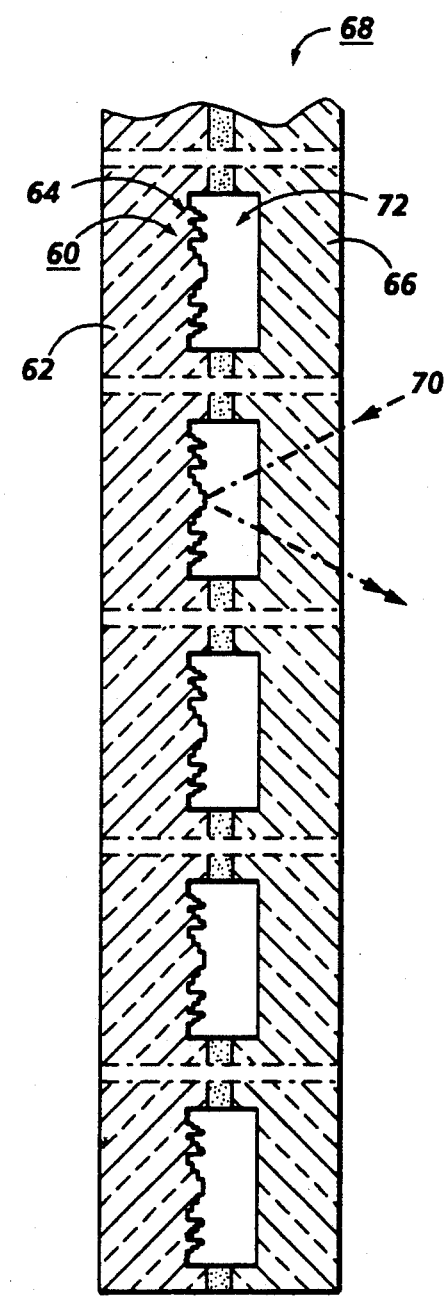
FIG. 7 is a schematic illustration of the cross-section side view of an alternate embodiment of a lens cover assembly for binary diffractive optic lenses with reflective coating with an incident light path through the lens cover formed according to the present invention.

After the binary diffractive optic lens 60 is fabricated on the lens substrate 62 in FIG. 7, the optic lens pattern is coated with a reflective coating 64. Reflective coatings are commercially available. The binary diffractive optic lens substrate 62 is then bonded with the lens cover substrate 66 to form the lens cover assembly 68.

The incident light beam 70 passes through the lens cover substrate 66, through the recess 72, is diffracted and reflected by the reflective coating 64 on the binary diffractive optic lens 60, passes through the recess 72 and passes through and exits the lens cover substrate 66. The incident and output light beams do not pass through the binary diffractive optic lens substrate.

As previously stated, the binary diffractive optic lens substrate 62 and the lens cover substrate 66 need not be the same material. The binary diffractive optic lens substrate of the lens cover assembly of FIG. 7 need not be fabricated from a material which is optically transmissive to the light beam. The reflective coating 64 must have a uniform thickness on the binary diffractive optic lens since the light is reflected from the intersection of the reflective coating on the binary diffractive optic lens and the recess.

Figure 8:
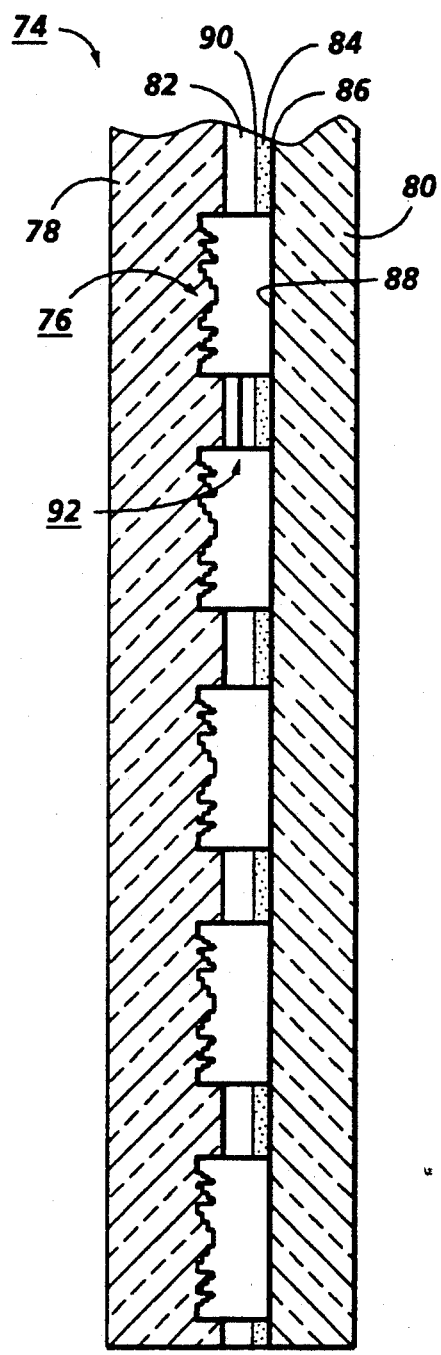
FIG. 8 is a schematic illustration of the cross-section side view of an alternate embodiment of the lens cover assembly for binary diffractive optic lenses formed according to the present invention.

Alternately, a lens cover assembly 74 for a binary diffractive optic lens 76 can be fabricated from a binary diffractive optic lens substrate 78 mounted from the lens cover substrate 80 by a spacing element 82, as shown in FIG. 8. The binary diffractive optic lens substrate 78 is bonded to the spacing element 82 which is bonded to the lens cover substrate 80 by the bonding means 84 as previously discussed. The lens cover assembly 74 of FIG. 8 is a "stand-off" lens cover assembly while the lens cover assembly 10 of FIG. 1 is a "substrate to substrate" lens cover assembly.

The binary diffractive optic lens substrate 78 is fabricated as discussed previously. The lens cover substrate 80 need not be fabricated to form a recess but can be any lens, grating, plastic surface, semiconductor surface, glass surface or any other surface.

The interior surface 86 of the lens cover substrate 84 should be generally flat or plano. The surface functions as the lens cover without the need to be patterned, etched or molded. The spacing element 82 separates the binary diffractive optic lens substrate 78 and the lens cover substrate 80 forming a recess 88 between the two substrates.

The spacing element 82 can be formed of fused silica (artificial quartz), glass, quartz, germanium, silicon, or any material that will be rigid and that can be bonded to the binary diffractive optic lens substrate 78 and the lens cover substrate 80. The spacing element 82 and the binary diffractive optic lens substrate 78 and the lens cover substrate 80 need not be of the same material. The spacing element needs to be rigid to support the binary diffractive optic lens substrate and the lens cover substrate apart and of uniform thickness to provide uniform spacing between the binary diffractive optic lens substrate and the lens cover substrate.

Typically, the spacing element 82 is a polyimide layer on the binary diffractive optic lens substrate 78. The binary diffractic optic lens pattern is formed on the substrate by photolithography or by molding. A polyimide layer is then applied to the surface of the binary diffractive optic lens substrate 78, typically 25 to 50 microns thick to a uniform thickness. The polyimide layer is patterned and removed from the area of the binary diffractive optic lenses by conventional means. The layer is then cured and hardened, bonding to the binary diffractive optic lens substrate 78.

The bonding means 84, such as an epoxy resin, is applied to the interior surface 90 of the polyimide layer 82 on the binary diffractive optic lens substrate 78. The substrates are aligned, pressed together, and bonded.

Certain polyimide and thermal setting epoxy resins may require heat curing. Materials for the binary diffractive optic lens substrate and the lens cover substrate must be selected which would not be effected by the heat curing temperature.

The stand-off lens cover assembly can be done in batch or multiple assemblies on the single substrate. The breather hole 92 can be formed in the polyimide layer, similar to breather hole 48 in FIG. 4C.

This lens cover assembly 74 can be used to protect compound lenses which are bonded together, or combinations of lenses, apertures, or gratings which are bonded together.

The incident light beam for the lens cover assembly 74 of FIG. 8 can be transmitted through either the binary diffractive optic lens substrate or the lens cover substrate. The binary diffractive optic lens can be reflective through the use of a reflective coating, as discussed previously, in which case, either the binary diffractive optic lens substrate or the lens cover substrate, depending upon the incident beam, can be formed of a non-transmissive material.

Depending upon the choice of materials for the binary diffractive optic lens substrate and the lens cover substrate, and the pattern of the binary diffractive optic lens, the lens cover assembly will allow the binary diffractive optic lens to diffract any wavelength of light in the ultraviolet, visible, or infrared spectrum.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A lens cover assembly for binary diffractive optic lenses comprising:
    a first substrate having a plurality of binary diffractive optic lenses on one surface of said first substrate,
    a second substrate having a plurality of recesses on one surface of said second substrate, said plurality of recesses corresponding to said plurality of binary diffractive optic lenses, and
    bonding means for securing said first and second substrates together such that each of said plurality of binary diffractive optic lenses is positioned in each of said plurality of recesses to form a lens cover assembly from the combination of one of said binary diffractive optic lens and one of said recesses.

2. The lens cover assembly for binary diffractive optic lenses of claim 1 wherein said recess slightly exceeds the dimensions of said binary diffractive optic lens in said lens cover assembly.

3. The lens cover assembly for binary diffractive optic lenses of claim 1 wherein said bonded first and second substrates are diced to form individual lens cover assemblies from the combination of one of said binary diffractive optic lens and one of said recesses.

4. The lens cover assembly for binary diffractive optic lenses of claim 1 wherein said one surface of said first substrate and said one surface of said second substrate are coated with an antireflective coating.

5. The lens cover assembly for binary diffractive optic lenses of claim 1 wherein said plurality of said binary diffractive optic lenses are coated with a reflective coating.

6. The lens cover assembly for binary diffractive optic lenses of claim 5 wherein said reflective coating has a uniform thickness on said plurality of said binary diffractive optic lenses.

7. The lens cover assembly for binary diffractive optic lenses of claim 1 wherein said bonding means is light absorptive.

8. The lens cover assembly for binary diffractive optic lenses of claim 1 wherein said plurality of binary diffractive optic lenses have at least two different diffractive patterns.

9. The lens cover assembly for binary diffractive optic lenses of claim 1 wherein a breather hole extends through said first substrate to said recess of said lens cover assembly.

10. The lens cover assembly for binary diffractive optic lenses of claim 1 wherein a breather hole extends through said second substrate to said recess of said lens cover assembly.

11. The lens cover assembly for binary diffractive optic lenses of claim 1 wherein a breather hole extends through said bonding means to said recess of said lens cover assembly.

12. The lens cover assembly for binary diffractive optic lenses of claim 1 wherein said binary diffractive optic lenses on said first substrate and said recesses on said second substrate are formed by photolithography.

13. The lens cover assembly for binary diffractive optic lenses of claim 1 wherein said binary diffractive optic lenses on said first substrate and said recesses on said second substrate are formed by molding.

14. The lens cover assembly for binary diffractive optic lenses of claim 1 wherein said bonding means are an epoxy resin.

15. A lens cover assembly for binary diffractive optic lenses comprising:
a first substrate having a plurality of binary diffractive optic lenses on one surface of said first substrate,
a second substrate,
a spacing element for separating said first substrate and said second substrate to form a plurality of recesses corresponding to said plurality of binary diffractive optic lenses, and
bonding means for securing said first and second substrates together such that each of said plurality of binary diffractive optic lenses is positioned with each of said plurality of recesses to form a lens cover assembly from the combination of one of said binary diffractive optic lens and one of said recesses.

16. The lens cover assembly for binary diffractive optic lenses of claim 15 wherein said spacing element is a polyimide layer.

17. The lens cover assembly for binary diffractive optic lenses of claim 15 wherein said bonded first and second substrates are diced to form individual lens cover assemblies from the combination of one of said binary diffractive optic lens and one of said recesses.

18. The lens cover assembly for binary diffractive optic lenses of claim 15 wherein said one surface of said first substrate and one surface of said second substrate forming said recess are coated with an antireflective coating.

19. The lens cover assembly for binary diffractive optic lenses of claim 15 wherein said plurality of said binary diffractive optic lenses are coated with a reflective coating.

20. The lens cover assembly for binary diffractive optic lenses of claim 19 wherein said reflective coating has a uniform thickness on said plurality of said binary diffractive optic lenses.

21. The lens cover assembly for binary diffractive optic lenses of claim 15 wherein said bonding means is light absorptive.

22. The lens cover assembly for binary diffractive optic lenses of claim 15 wherein said plurality of binary diffractive optic lenses have at least two different diffractive patterns.

23. The lens cover assembly for binary diffractive optic lenses of claim 15 wherein a breather hole extends through said first substrate to said recess of said lens cover assembly.

24. The lens cover assembly for binary diffractive optic lenses of claim 15 wherein a breather hole extends through said second substrate to said recess of said lens cover assembly.

25. The lens cover assembly for binary diffractive optic lenses of claim 15 wherein a breather hole extends through said bonding means to said recess of said lens cover assembly.

26. The lens cover assembly for binary diffractive optic lenses of claim 15 wherein a breather hole extends through said spacer element to said recess of said lens cover assembly.

27. The lens cover assembly for binary diffractive optic lenses of claim 15 wherein said binary diffractive optic lenses on said first substrate are formed by photolithography.

28. The lens cover assembly for binary diffractive optic lenses of claim 15 wherein said binary diffractive optic lenses on said first substrate are formed by molding.

29. The lens cover assembly for binary diffractive optic lenses of claim 15 wherein said bonding means are an epoxy resin.

30. The lens cover assembly for binary diffractive optic lenses of claim 15 wherein said spacing element is formed by photolithography.

* * * * *